(12) United States Patent
Miraldo et al.

(10) Patent No.: US 11,269,839 B2
(45) Date of Patent: Mar. 8, 2022

(54) AUTHENTICATED KEY-VALUE STORES SUPPORTING PARTIAL STATE

(71) Applicant: Oracle International Corporation, Redwood City, CA (US)

(72) Inventors: Victor Cacciari Miraldo, Utrecht (NL); Harold Carr, Sandy, UT (US); Maurice P. Herlihy, Burlington, MA (US); Alex Kogan, Burlington, MA (US); Mark Sean Moir, Wellington (NZ)

(73) Assignee: Oracle International Corporation, Redwood City, CA (US)

( * ) Notice: Subject to any disclaimer, the term of this patent is extended or adjusted under 35 U.S.C. 154(b) by 417 days.

(21) Appl. No.: 16/355,563

(22) Filed: Mar. 15, 2019

(65) Prior Publication Data

US 2019/0370241 A1 Dec. 5, 2019

Related U.S. Application Data

(60) Provisional application No. 62/680,988, filed on Jun. 5, 2018.

(51) Int. Cl.
| | | |
|---|---|---|
| G06F 17/00 | (2019.01) | |
| G06F 7/00 | (2006.01) | |
| G06F 16/22 | (2019.01) | |
| G06F 16/182 | (2019.01) | |
| H04L 9/32 | (2006.01) | |
| H04L 9/06 | (2006.01) | |

(52) U.S. Cl.
CPC ...... *G06F 16/2255* (2019.01); *G06F 16/1824* (2019.01); *H04L 9/0643* (2013.01); *H04L 9/32* (2013.01); *H04L 2209/38* (2013.01)

(58) Field of Classification Search
CPC ............ G06F 16/2255; G06F 16/1824; H04L 9/0643; H04L 9/32; H04L 2209/38
USPC .......................................................... 707/747
See application file for complete search history.

(56) References Cited

U.S. PATENT DOCUMENTS

| | | |
|---|---|---|
| 5,978,475 A | 11/1999 | Schneier et al. |
| 7,315,866 B2 | 1/2008 | Wu et al. |

(Continued)

FOREIGN PATENT DOCUMENTS

| | | |
|---|---|---|
| CN | 106973036 | 7/2017 |

OTHER PUBLICATIONS

Mike Hearn, "Corda: A Distributed Ledger" (https://www.corda.net/content/corda-technical-whitepaper.pdf), dated Nov. 29, 2016, pp. 1-58.

*Primary Examiner* — Pavan Mamillapalli
(74) *Attorney, Agent, or Firm* — Robert C. Kowert; Kowert, Hood, Munyon, Rankin & Goetzel, P.C.

(57) ABSTRACT

An authenticated modular map library may support partial state for a key-value store. A key-value store may be created that is organized as a tree data structure that divides items into pages. Features to access the key-value store may also be specified when the key-value store is created. A portion of the key-value store may be sent to a participant of a blockchain network, which may attempt to access an item to be found in a page in the key-value store according to the specified features. If the page is not included in the portion, the page may be requested from another participant, received, and verified before being used to complete the attempted access of the item.

21 Claims, 10 Drawing Sheets

(56) References Cited

U.S. PATENT DOCUMENTS

| | | | |
|---|---|---|---|
| 9,241,044 B2 | 1/2016 | Shribman et al. | |
| 9,589,152 B2 | 3/2017 | Sheets | |
| 9,774,578 B1 | 9/2017 | Ateniese et al. | |
| 9,998,150 B1* | 6/2018 | Lazier | G06F 11/1088 |
| 10,826,709 B1* | 11/2020 | Zhuo | G06F 21/64 |
| 2014/0351903 A1* | 11/2014 | Ding | H04L 67/10 |
| | | | 726/5 |
| 2017/0366353 A1* | 12/2017 | Struttmann | G06F 21/64 |
| 2018/0063238 A1* | 3/2018 | Zhang | G06F 11/1425 |
| 2018/0150647 A1* | 5/2018 | Naqvi | H04L 9/3218 |
| 2019/0020468 A1* | 1/2019 | Rosenoer | H04L 63/0414 |
| 2020/0374113 A1* | 11/2020 | Noam | H04L 9/0847 |

\* cited by examiner

```
                                                     IsMap type class 300
type ErrM c = Except (Err c)

class IsMap (c :: *→*→*) where
        type Err c :: *
        type IsMapCnstr c k v :: Constraint
        toList :: (IsMapCnstr c k v)
                    ⇒ c k v → ErrM c[(k,v)]
        lookup :: (IsMapCnstr c k v)
                    ⇒ k → c k v
                    → ErrM c (Maybe v)
        empty :: (IsMapCnstr c k v)
                    ⇒ c k v
        delete :: (IsMapCnstr c k v)
                    ⇒ k → c k v → ErrM c (c,k,v)
        insert :: (IsMapCnstr c k v)
                    ⇒ k → v
                    → c k v → ErrM c (c,k,v)
        adjust :: (IsMapCnstr c k v)
                    ⇒ (v → v) → k
                    → c k v → ErrM c (c,k,v)
```

FIG. 3

```
                                                         IsAuthMap class 400
class (IsMap c) ⇒ IsAuthMap (c :: *→*→*) where type Ev c :: * fingerprint :: c k v → Digest vlookup :: (IsMapCnstr c k v, Dig2 k v)

⇒ k → c k v

→ ErrM c (Maybe (v, Ev c))

rebuild :: (Dig2 k v)

⇒ Proxy c → k → v → Ev c → Maybe Digest
```

*FIG. 4*

```
                                         Recording page index for error 700
type Page = Int
instance (Dimension l, IsMap c) ⇒ IsMap (PagesOf l c)
  where
  type Err (PagesOf l c) = (Page, Err c)
  type IsMapCnstr (PagesOf l c) k v =
    (IsMapCnstr c k v, Hashable k)
  insert k v m
    = let rt = dimRoute (Proxy :: Proxy l) k
      in case runExcept(ModifyAt rt m(insert k v)) of
      Left err → throwError (whichPage k, err)
      Right m' → return m'
  ...
```

FIG. 7

```
                                              partitioned interface 800
class (IsAuthMap c, IsAuthMap (Part c))
        ⇒ Partitioned c where
    type Part c :: *→*→*
    parts :: Proxy c → Int
    partMapWithIdx :: (Monad m)
            ⇒ (Int → Part c k v → m(Part c k v))
            → c k v → m (c k v)
    onPart :: (MonadError (M.Err (Part c)) m)
            ⇒ (Part c k v → m(Part c k v))
            → Int → c k v → m (Maybe (c k v))
    getPart :: Int → c k v → Maybe (Part c k v)
```

FIG. 8

```
                                                          eviction policy class 900 class EvictionPolicy (policy :: * → *) where
        type PolicyCtr policy k :: Constraint
        epEmpty :: policy k
        epSize  :: policy k → Int
        epHit   :: (PolicyCtr policy k)
                  ⇒ k → policy k → policy k
        epDrop  :: (PolicyCtr policy k)
                  ⇒ k → policy k → policy k
        epEvict :: (PolicyCtr policy k)
                  ⇒ policy k → Maybe (k, policy)
```

FIG. 9

```
                                                          vlookup function 1000 vlookup :: (Eq k, Ord k, Dig2 k v) ⇒
           RB k v → k → Maybe (v, Ev RB)
vlookup Tip               tgt = Nothing
vlookup (Bin c k v l r) tgt
    | tgt = k = Just(v, EvStop c (hash l) (hash r))
    | tgt > k = (id *** EvR c (hash l) (digestKV k v)) <$>
                vlookup (unauth r) tgt
    | tgt < k = (id *** EvL c (hash r) (digestKV k v)) <$>
                vlookup (unauth l) tgt
  where
    (f *** g) (x,y) = (f x, g y)
    digestKV k v = dcat [digest k, digest v]
```

FIG. 10

AUTHENTICATED KEY-VALUE STORES SUPPORTING PARTIAL STATE

RELATED APPLICATIONS

This application claims benefit of priority to U.S. Provisional Application Ser. No. 62/680,988, entitled "AUTHENTICATED KEY VALUE STORES SUPPORTING PARTIAL STATE," filed Jun. 5, 2018, and which is incorporated herein by reference in its entirety.

BACKGROUND

Field of the Disclosure

This disclosure relates generally to verification of data in a decentralized network.

Description of the Related Art

Centralized storage, control and trust have resulted in massive data breaches, privacy violations, fraud and other problems, often with a lack of transparency and accountability. Decentralized storage or other decentralized systems may alleviate some these problems. One example of a decentralized system is a blockchain network or system in which participants that do not (fully) trust each other nonetheless cooperate to mediate transactions and processes following precise rules.

How trust is enabled between participants in a decentralized system so that participants can share data can impact the performance of the decentralized system. For example, blockchain networks may share data in the form of key-value stores (maps from keys to values). Key-value stores are commonly used in blockchain implementations to represent the "state of the world" (i.e., the state resulting from executing all previous transactions). A reliable recent state of the world is needed to begin participation and thus techniques that can verify data to determine a reliable state in decentralized data store are highly desirable.

BRIEF DESCRIPTION OF THE DRAWINGS

FIG. 3 illustrates an example IsMap type class, according to some embodiments.

FIG. 4 illustrates an example IsAuthMap class, according to some embodiments.

FIG. 7 illustrates an example index for page error recording, according to some embodiments.

FIG. 8 illustrates an example partitioned interface, according to some embodiments.

FIG. 9 illustrates an example eviction policy class, according to some embodiments.

FIG. 10 illustrates an example vlookup function, according to some embodiments.

Figure 1:
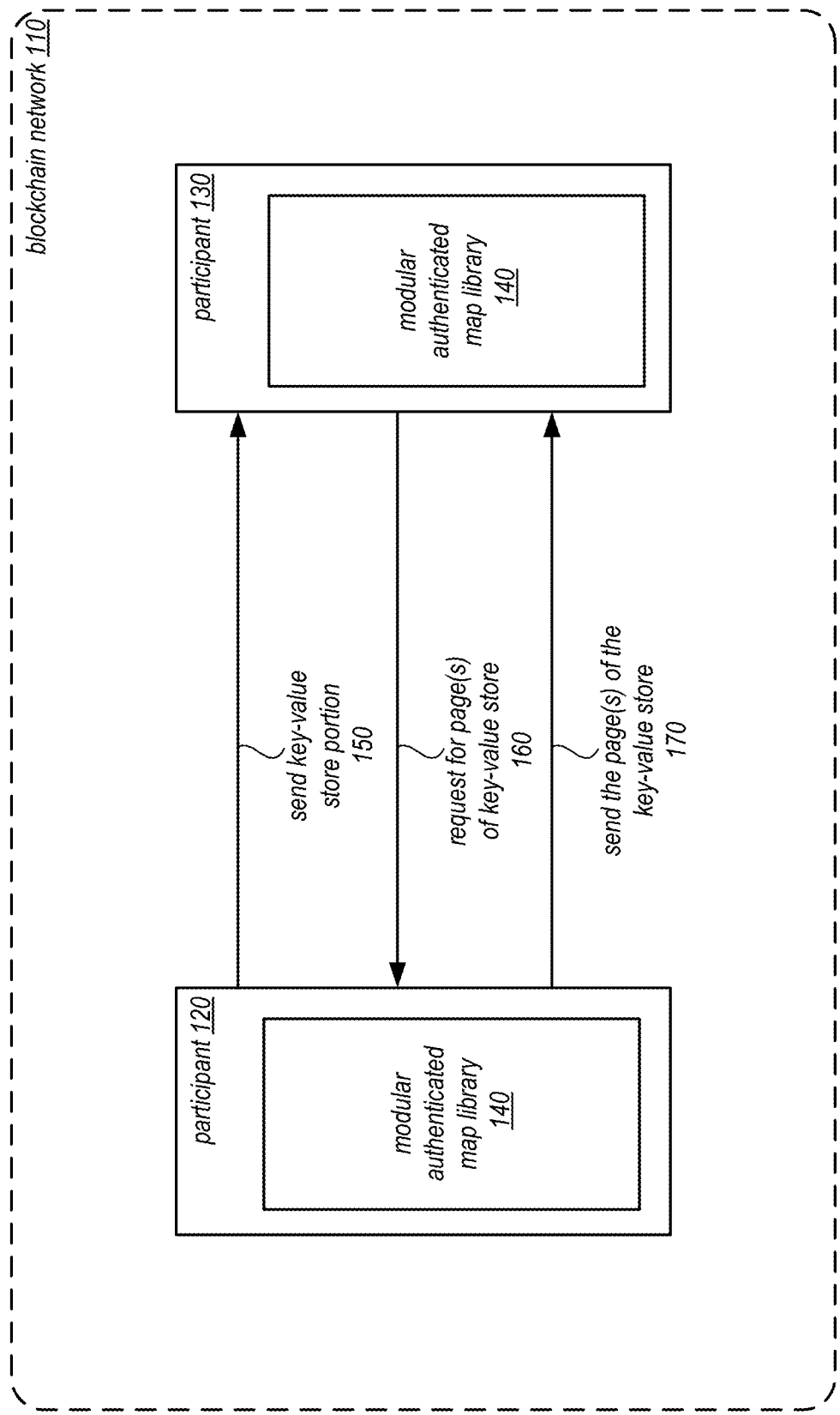
FIG. 1 illustrates a logical block diagram of blockchain network participants that implement a modular authenticated map library to implement authenticated key-value stores supporting partial state, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Techniques for authenticated key-value stores supporting partial state are described herein in various embodiments. Participants in blockchain networks or other decentralized systems where participants may want to verify transactions in the decentralized system may use a key-value store (e.g., a "world state") that is the result of executing all transactions since the beginning of time. Executing all transactions can take a long time, and this time can grow larger as the blockchain network runs longer. In various embodiments, authenticated key-value stores supporting partial state can enable a participant in a blockchain network to verify a world state based on partial data, and to fetch and verify other data later as needed. This approach can improve the performance of a system implementing blockchain participation as it can reduce the time needed to begin participation as compared to, for example, having to download all blocks of a blockchain and verify all transactions, or other techniques which may acquire a "root hash" for the world state based on all of the block headers and then retrieve the world state from an untrusted party and verify it against the root hash. The latter approach still requires the entire world state to be retrieved, which grows larger over time).

In various embodiments, authenticated key-value stores supporting partial state may allow an authenticated data structure to be verified and used without receiving the entire data structure. For example, authenticated key-value stores supporting partial state enable programmers to define configurations using a variety of combinators, as discussed below with regard to FIG. 2, thus achieving different implementations without having to code them separately, in some embodiments. In another example, authenticated key-value stores supporting partial state enable some parts of the data structure to be "missing" and to be replaced with a digest or hash that can be used later to verify the missing data if it is requested, in some embodiments.

In various embodiments, authenticated key-value stores supporting partial state may enable participants to more quickly acquire a usable world state in a blockchain network so that new participants can join faster. This further enables more effective governance (e.g., replacing a faulty or corrupt node to restore health to the network more quickly), more flexible participation (a new partner can be onboarded faster), and more agile resource management (e.g., load balancing), in some embodiments. It also facilitates techniques such as regular reassignment of tasks between participants, making a "moving target" for anyone attempting to corrupt others in order to compromise the network, in some embodiments.

In at least some embodiments, authenticated key-value stores supporting partial state for use in systems like blockchain networks may be implemented using a software library, package, or other collection pre-defined techniques that provide a common interface for interacting with the authenticated key-value stores. In one such embodiment, a Haskell programming language library may be used to implement authenticated key-value stores using a map structure, as discussed below starting with FIG. 2. For example, FIG. 1 illustrates a logical block diagram of blockchain network participants that implement a modular authenticated map library to support authenticated key-value stores supporting partial state, according to some embodiments. Blockchain network 110 may be a blockchain network that utilizes a public blockchain like the Ethereum or Bitcoin blockchain protocols or may be a permissioned blockchain network like the Hyperledger Fabric protocol.

Blockchain network 110 may implement different participants, such as participant 120 and 130, which may implement applications, programs, or other system components for participating in blockchain network 110 according to the blockchain network type or protocol of blockchain network 110. As part of implementing applications for participants 120 and 130, a modular authenticated map library 140 may be included in order to implement an authenticated key-value store recording world state of blockchain 110 that is shared between participants 120 and 130. For example, as discussed in detail below with regard to FIGS. 11 and 12, a key-value store may be created using a modular authenticated map library 140. For example, different features may be specified when the key-value store is created to optimize key-value store performance (e.g., using Bloom filters and caches), as discussed below.

Modular authenticated map library 140 may also allow features of the key-value store to organize the content of the key-value store into pages and partitions to support the transfer and authentication of partial state of the key-value store. For example, participant 120 (or other participant not illustrated) may create a key-value store that is organized into various pages, as discussed below with regard to FIGS. 5 and 6. Participant 120 may then send some portion of the key-value store 150 to participant 130 as part of an application utilizing blockchain network 110 (without sending all of the key-value store), in some embodiments.

Participant 130 can utilize modular authenticated map library 140 to make use of as a consistent interface to interact with the received portion of the key-value store, including performing operations to validate the content of the received portion. As part of executing the application utilizing blockchain network 110, participant 130 may identify portion(s) of the key-value not included in the portion (e.g., by identifying and attempting to access pages of the key-value store not present in the received portion). For example, the lookup, delete, insert, or other operations discussed below with regard to FIG. 3 may utilize the page features specified at creation of the key-value store to identify which page(s) are missing and how to indicate which pages to request in a request for the page(s) of the key-value store 160, sent from participant 130 to participant 120. Participant 120 can then retrieve the identified page(s) and send the requested page(s) to participant 130, in some embodiments.

Type level programming techniques may be used to establish an extensible foundation for implementing a modular authenticated map library, such as modular authenticated map library 140 discussed above, in order to provide an example base map with several example transformers, in some embodiments. In this way, programmers for participants in decentralized networks can then create base maps and transformers via declarations using the modular authenticated map library, in some embodiments. In some embodiments, the modular authenticated map library may be implemented in the Haskell programming language (referred to herein as the Haskell Authenticated Modular Maps (HAMM) library), which may provide an example of a modular authenticated map library that provides a domain specific language for constructing a wide variety of authenticated map implementations via a consistent interface.

In some embodiments, the modular nature of HAMM or other modular authenticated map libraries may allow programmers to combine different features in a key-value store so that the key-value store may be tuned according to an anticipated workload for the key-value store. For example, the following declaration specifies a map type in HAMM that is a key-value store with keys of type k and values of type v that caches up to n recently accessed items in a red-black tree using a Least Recently Used (LRU) cache eviction policy, and has a Bloom filter of size m bits using h hash functions for quickly checking whether a key not found in the cache may be present in the underlying map. The underlying map may hash keys into pages (e.g., 48 pages), accessed via a tree with a branch factor (e.g., branching factor of 3) at the first level and another branching factor (e.g., a branching factor of 4) at two levels below that, where each page is a red-black tree that may be present or missing. The example declaration may be:

---
BoundedCacheOf n LRU RB
  (BloomOf m h
    (PagesOf ' [3,4,4] (PartialOf RB)))k v

---

In various embodiments, supporting "missing" pages may enable a participant to begin work without first acquiring the entire map state. Attempting to access an item in a missing page may trigger an error, allowing the caller to request an additional page, authenticate the response, and continue with the new data in place.

Instead of implementing such a type directly (which could be intricate, error-prone and inflexible), a modular authenticated map library like HAMM may provide programmers with an expressive set of combinators to construct map types in various configurations while maintaining a consistent interface, in various embodiments. For instance, HAMM may support base map types (e.g., red-black trees) and transformers (e.g., "BloomOf", "CacheOf", "PartialOf", etc.) that programmers can use to extend underlying map types in various ways.

Figure 2:
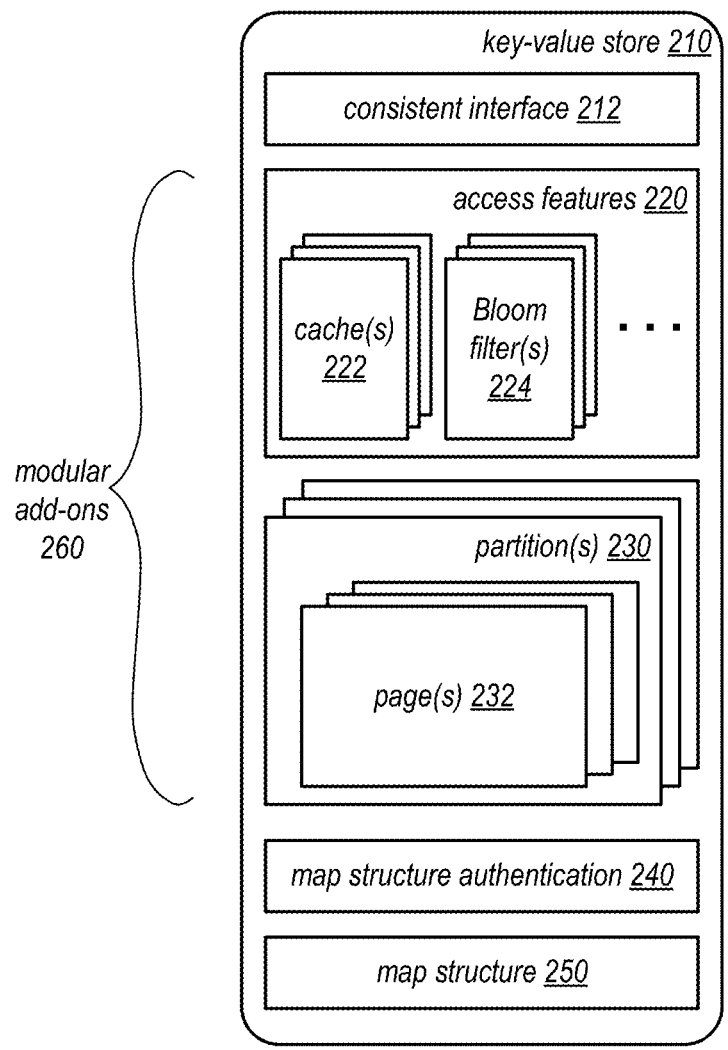
FIG. 2 illustrates a logical block diagram of a key-value store that can be created using a modular authenticated map library, according to some embodiments.

FIG. 2 illustrates a logical block diagram of a key-value store that can be created using a modular authenticated map library, according to some embodiments. Key-value store 210 may have a consistent interface 212, that is implemented to provide various operations to interact with the key-value store that can leverage modular add-ons 260, such as access features 220, without an application having to directly implement the modular add-ons 260 for key-value sore 210. For example, the IsMap type class 300 and IsAuthMap class 400 discussed below with regard to FIGS. 3 and 4 may provide an interface to lookup, empty, delete, insert, adjust, or validate portions of a key-value store according to a baseline map structure 250 and map structure authentication feature 240.

Key-value store 210 can include none, one, or multiple access features 220 to optimize access performance to key-value store 210. For example, one (or multiple) Bloom filter(s) 224 can be implemented for different portions (e.g., partitions or other groups of pages) of a key-value store as noted above and discussed in more detail below. Similarly, cache(s) 222 can be implemented to store results of prior reads from key-value store 210 in order to save key-value store search time, as discussed in further detail below including a discussion regarding the configuration of cache (s) 222 according to an eviction policy in FIG. 9.

Key-value store 210 can be organized through a modular add-on 260 into page(s) 232 and partitions 230 (that include one or multiple page(s) 232), in some embodiments. In this way, support for validating and exchanging partial state of a key-value store can be provided. Additionally, in some embodiments, the separation of page(s) 232 into partitions (s) 230 can allow for access features 220 to be specified for individual partitions 230 and thus the page(s) 232 included in the individual partitions.

This specification began with a general description of modular authenticated map libraries that may to implement authenticated key-value stores supporting partial state. Next various examples of a Haskell implementation of a modular authenticated map library HAMM are discussed, including different types, classes, or other features of the library, that may be employed as part of implementing a key-value store with various modular add-ons or features, some which were noted above. A number of different methods and techniques to utilize a modular authenticated map library are then discussed, some of which are illustrated in accompanying flowcharts. Finally, a description of an example computing system upon which the various components, modules, systems, devices, and/or nodes may be implemented is provided. Various examples are provided throughout the specification.

In some embodiments, map types constructed using HAMM may employ techniques similar to those used with regard to a Merkle tree to enable authentication of a map received from an untrusted participant, and furthermore to enable missing data to be received and authenticated later. In this way, the entire map does not have to be retrieved and authenticated before beginning work. In some embodiments, HAMM may include or be implemented in conjunction with unified frameworks that enable robust testing and performance evaluation of individual components that can be combined to achieve a wide variety of configurations.

In some embodiments, HAMM may include an "IsMap" type class. The "IsMap" type class may provide the API available to the programmer. A key-value store in HAMM may be an instance of that type class, in some embodiments. In some embodiments, methods may be similar to "Data-.Map" from standard libraries. In some embodiments, key-value stores created using HAMM may throw different errors, which may be accounted for at the type level. For example, the "insert" function from "Data.Map" has the type:

$$\text{insert} :: (\text{Ord } k) \Rightarrow k \to v \to \text{Map } k\ v \to \text{Map } k\ v$$

In the above example, Map may be a polymorphic key-value store that receives two types as arguments and returns a type. That is, Map may have kind $* \to * \to *$. Data.Map may be implemented as an AVL tree, for example, and may therefore need to compare keys for some operations. Thus, type k may be required to satisfy the Ord k constraint. Note, other embodiments may implement Map using different constraints on the types of keys and values.

In some embodiments, Map could be substituted for an arbitrary type variable of the same kind, which may be referred to as $c :: * \to * \to *$. The implementor of c may specify any restrictions on the key type, Using only (Ord k) may not be enough in some instances. To enable different constraints to be used for different maps implemented using HAMM, a constraint synonym may be used:

$$\text{insert} :: (\text{IsMapCnstr } c\ k\ v) \Rightarrow k \to v \to c k v \to c k v$$

IsMapCnstr c k v may represent a constraint on which key and value types can work with the key-value store c.

In some embodiments, the Except monad may be used to enable operations on potential key-value stores to fail gracefully. Because the type of failures may be dependent on c, the type of errors that c is allowed to throw may be represented using a type-family:

$$\text{insert} :: (\text{IsMapCnstr } c\ k\ v) \Rightarrow k \to v \to c k v \to \text{Except (Err c) } (c k v)$$

In this example, the insert function may have a general declaration that can be satisfied by many such c's. Similar implementations may be used to implement other functions in Data.Map (e.g., by using the Except monad and two type families, Err c that encodes the type of errors that c can throw and IsMapCnstr c k v that encodes the constraints that c may impose on the key and value types.

FIG. 3 illustrates an example IsMap class that may be implemented, according to some embodiments. IsMap type class 300 may illustrate various example implementations of map functions, such as toList, lookup, empty, delete, insert, and adjust.

In various embodiments, cryptographic techniques may be used to determine or prove whether an element belongs to a set. For example, techniques similar to those used in Merkle trees may be adapted, in some embodiments. In a Merkle tree, each non-leaf node may contain a cryptographic hash of the concatenation of the hashes of its two children. This may make it essentially impossible to change the content of the tree without changing the hash at the root of the tree (the Merkle root). Thus, a participant that knows the Merkle root of a tree can recompute the hashes for a tree provided by an untrusted party, and be confident that it has received the correct tree contents. More generally, the hashes on a path from a leaf to the root can be recomputed, given the data value for the leaf and the hashes for the siblings of each node on the path to the root (the sibling hashes ensure that onpath hashes can be recomputed without requiring the data in their subtrees to be present). Such a Merkle path provides evidence to give the recipient confidence that the data value it has received is indeed in the tree from which the known Merkle root was computed.

Different combinations of key-value structures may use different forms of evidence (analogous to Merkle paths) that can be used to validate the structure against a top-level known hash (analogous to Merkle roots), in some embodiments. For example, type families may be employed to enable the use of different types of evidence for different types of key-value stores constructed using HAMM. A key-value store c::*→*→* in HAMM may have an associated type of evidence of membership, Ev c::* that can be used to prove that some key-value pair belongs in the map.

FIG. 4 illustrates an example authentication class, IsAuthMap, according to some embodiments. IsAuthMap class 400 may provide an interface for authentication, in some embodiments. For example, a constraint synonym Dig2 k v=(Digestible k Digestible v) may be used to facilitate writing constraints. The Digestible class may be responsible for different types that are used, in some embodiments. In some embodiments, the digest may be byte strings, the byte strings could be wrapped in a new type Digest to avoid confusion, in which case the Digestible class may be:

```
class Digestible a where
    digest :: a → Digest
```

In some embodiments, authentication functionality may be accessed via different functions (as illustrated in FIG. 4). For example, fingerprint may provide the top-level hash (e.g., analogous to a Merkle root) of an arbitrary key-value store c. Another example function, vlookup, may look up a value and produce evidence to prove the result is in the map. Another example function, rebuild, may recompute the top-level hash of the key-value store in which the provided key-value pair was found. The rebuild function may require a Proxy in some embodiments as the type variable c appears only as the argument to a type family, which may not be injective. A compiler may use the Proxy to enable disambiguation.

Access functions, such as the examples given above, may allow verification that a key-value pair is in a map with a given top-level hash given evidence from the associated lookup, such as:

```
verify :: (IsAuthMap c, IsMapCnstr c k v, Dig2 k v)
    ⇒ Proxy c → k → v → Ev c → Digest → Bool
verify p k v ev root
    = maybe False (=root) (rebuild p k v ev)
```

Monad Transformers of Haskell provide combinators that alter the behavior of an arbitrary monad. These combinators have kind t::(*→*)→*→*: given a functor (kind *→*), they yield another functor. Using type classes, if an argument to t is a monad, then so is t m:
  instance Monad m⇒Monad (t m) where . . . .
In some embodiments, a similar technique can be applied to key-value stores. Because a key-value store may be a type of kind *→*→*, it may receive a type of keys and type of values and it may yield a type, in some embodiments. A key-value store transformer may then have a kind (*→*→*) →*→*→*, call it t. The instances for IsMap may be provided analogously to the Monad example above:

```
instance IsMap c ⇒ IsMap (t c) where . . .
instance IsAuthMap c ⇒ IsAuthMap (t c) where . . .
```

Transformers, such as the examples given above may be Add-ons, and live under Data.Auth.Map.Addons. In some embodiments, Add-ons may be any t such as above (e.g., with a correct kind and that preserves the IsMap and IsAuthMap instances of its argument).

In some embodiments, a base map may be provided with HAMM. The base map may be implemented as a Red-Black tree in some embodiments. The RB type, which may live in Data.Auth.Map.Base.RB, may comprise an authenticated Red-Black tree with a key-value pair in each node, in some embodiments. In some embodiments, the hashes of sub-trees may be pre-computed and maintained, but in other embodiments they may not. For example:

```
data Color = R | B
data RB k v
    = Tip
    | Bin {color :: Color
        ,key :: k
        ,val :: v
        ,left :: Auth (RB k v)
        ,right :: Auth (RB k v)
        }
```

In some embodiments, Auth may store a digest (e.g., a hash value), alongside another value:
  data Auth a=Auth {unauth::a, hash Digest}
In some embodiments, functions operating over an arbitrary RB k v may require an instance of Ord k because the comparison of keys may be performed in order to navigate within the tree. An instance for Digestible k and Digestible v may be used, in some embodiments, for computing cryptographic hashes. IsMapCnstr RB k v may be defined as (Ord k, Digestible k, Digestible v), in some embodiments.

In some embodiments, an RB key-value store may not throw errors, as necessary functions may be total and pure. In such embodiments, the error type may be defined as Void, an empty data type.

In some embodiments, an instance may be declared for IsMap. For example:

```
instance IsMap RB where
    type Err RB = Void
    type IsMapCnstr RB k v
        = (Ord k, Digestible k, Digestible v)
    . . .
```

In some embodiments, the value of type Except Void may be transformed into a value of type a by the means of:

```
cast :: Except Void a → a
cast :: fromRight ° runExcept
    where fromRight (Right x) = x
```

The fromRight may never receive a Left from runExcept, in some embodiments. In order to get to that branch, one would need to produce a value of type Void, which would not be possible. In this way, a pure interface may be provided to IsMap c, that ignores the Except monad whenever possible, in some embodiments.

Accessing the pure interface for a key-value store c may require a function with type Err c→Void, in some embodiments. This may be more flexible than requiring the error type to be exactly Void. Some combinations of add-ons result in an error type of Either Void Void, which is also uninhabited. Thus, by encoding error information by means of associated types, static guarantees about the absence of errors for any combination of add-ons that individually make such guarantees may be provided, ensuring that casting to the pure interface is safe for such combinations too, in some embodiments.

In some embodiments, once a type is defined that has a base instance IsMap, add-ons may be used to change the base instance's behavior. For example, a Bloom Filter can be added to our red-black tree, in one embodiment. In some embodiments, a Bloom filter may be a set-like data structure that enables fast membership queries that never yield a false statement (though false positives may be possible). For instance, a large RB tree for which most operations are lookups that return False may implement a Bloom filter to avoid most lookups on the underlying tree. For example, a Bloom filter may be combined with an already existing map. Consider that a Bloom data type that provides bloomMember and bloomInsert operations. This filter can be combined with a RB tree as follows:

```
data BloomOf k v = BloomOf Bloom (RB k v)
instance IsMap BloomOf where
    type Err BloomOf = Err RB
    type IsMapCnstr BloomOf k v
        = (IsMapCnstr RB k v, Hashable k)
    ...
    lookup k (BloomOf bl rb)
        | bloomMember (hash k) bl = lookup k rb
        | otherwise = return Nothing
    insert k v (BloomOf bl rb)
        = BloomOf (bloomInsert (hash k) bl)
        <$> (insert k v rb)
    ...
```

Note the use of the IsMapCnstr already implemented for RB and an additional constraint that the key type is Hashable. This constraint may be needed for the Bloom filter, in some embodiments. Add-ons implemented in this way can be added on top of an arbitrary map and alter its internal functionality. The RB may be abstracted away by means of a type variable, in order to get the higher-order version of BloomOf. For example:

```
data BloomOf c k v = BloomOf Bloom (c k v)
instance IsMap c ⇒ IsMap (BloomOf c) where
    type Err (BloomOf c) = Err c
    type IsMapCnstr (BloomOf c) k v
        = (IsMapCnstr c k v, Hashable k)
    ...
    lookup k (BloomOf bl c)
        | bloomMember k bl = lookup k c
        | otherwise = return Nothing
    ...
```

In the above example, BloomOf has kind (*→*→*) →*→*→* and receives an arbitrary key-value store and adds an additional layer of functionality to a couple of its functions. The Of suffix may be used, in some embodiments, to denote add-on names.

When creating an empty Bloom filter, some configuration parameters may be specified, such as the size of the filter and the number of hash functions to use. In some embodiments, static information may be put in at the type level. For example, using the DataKinds and PolyKinds language extensions, the configuration parameters could be written as:

```
data BloomOf (m::Nat) (hashN :: Nat) c k v
    = BloomOf (Bloom m hashN) (c k v)
instance (KnownNat m, KnownNat hashN, IsMap c)
    ⇒ IsMap (BloomOf m hashN c) where
    ...
```

In the above example, m and hashN are types of kind Nat. These type level values may specify static parameters for the Bloom filter.

Figure 5:
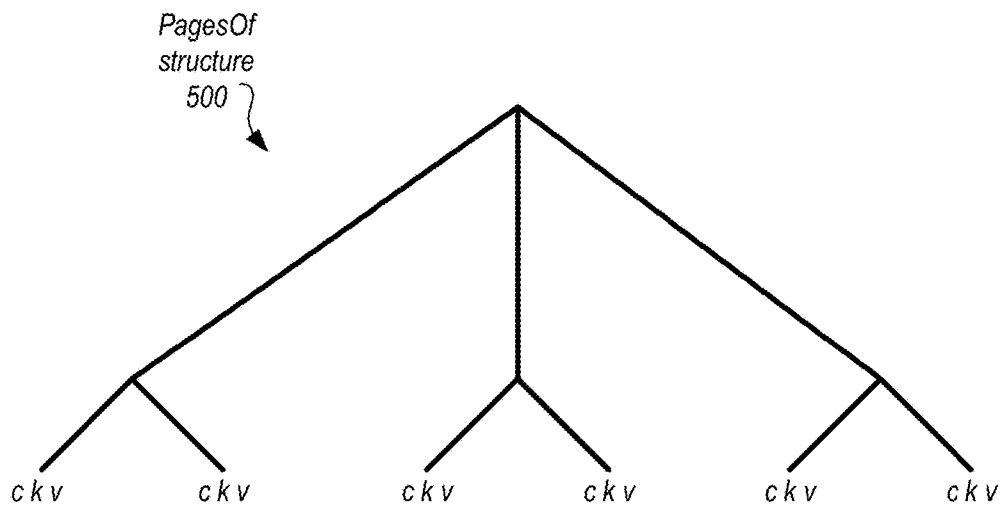
FIG. 5 illustrates an example PagesOf structure, according to some embodiments.
Figure 6:
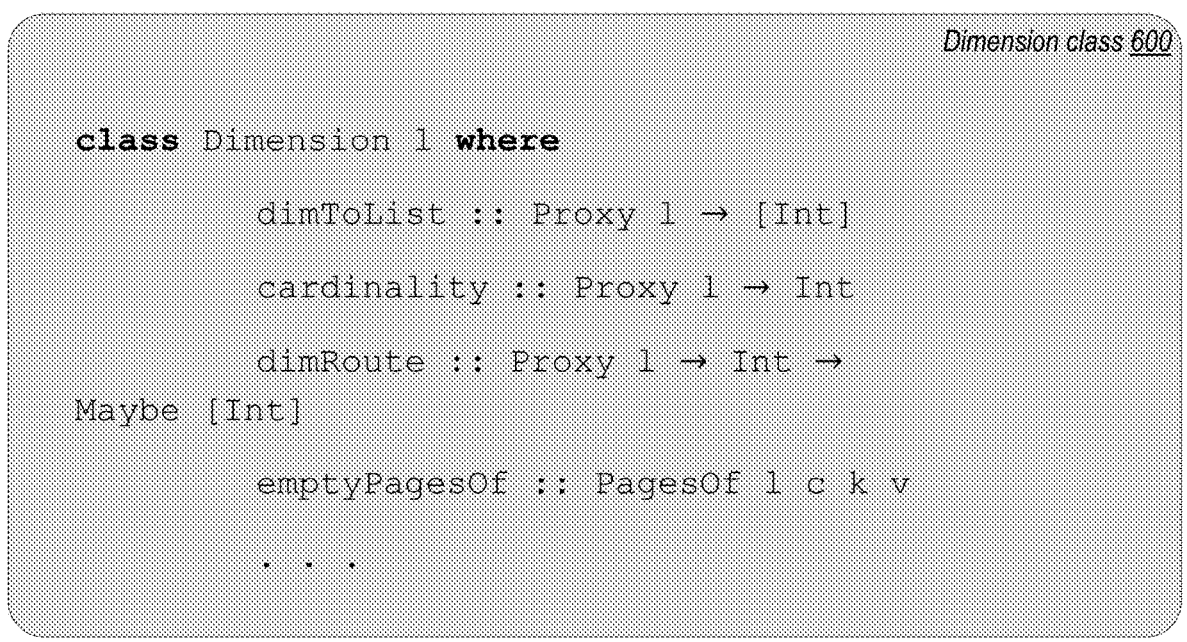
FIG. 6 illustrates an example Dimension class, according to some embodiments.

In some embodiments, another example of an add-on may be paging. Paging may enable a key-value store to be divided into pages, in some embodiments. In this way, a map value can be transferred and used, without requiring all of the contents of the map to be transferred first. In some embodiments, pages may be organized as leaves of a tree, in which internal nodes may contain hashes of subtrees, providing support for authenticated lookup and verification. For example, the branching structure of the tree introduced by the PagesOf add-on may be specified as a type level list of numbers. FIG. 5 illustrates a value of type PagesOf [3, 2] c k v.

In some embodiments, different branching structures provide different advantages. Larger branching factors result in flatter trees, for instance, and thus may enable faster lookups and verification. The PagesOf add-on may use a GADT indexed on the branching factor list, such as:

```
data PagesOf(l :: [Nat]) c k v where
    Page :: c k v → PagesOf '[ ] c k v
    Node :: [Auth (PagesOf l c k v)]
        → PagesOf (n ':l) c k v
```

The Node constructor may have an n-tuple inside, but alternatively, a list with length n could be used instead, in some embodiments. Extra care may be taken in such embodiments to ensure the list's length is n. A Node may have to have at least one child, in some embodiments. For instance, PagesOf [0, 3, 2] would have no leaves. In some embodiments, not all Nats make valid branching factors. However, by specifying a class of valid branching factor lists, the invalidity of some Nats could be solved. Valid branching factors may be referred to as the Dimensions of the PagesOf in some embodiments.

In some embodiments, the instance declarations for [ ] and : may be used to access the branching structure, such as:

```
instance Dimension '[ ] where . . .
instance Dimension l ⇒ Dimension (n ': l) where . . .
```

For example, the number of pages in PagesOf may be the product of the branching factors. We may define a dimToList function to convert the list to a first-class object because 1 is a type level list (and thus product may not be called). Cardinality may compose product with dimToList to determine the total number of pages, in some embodiments. The Dimension class 600 may be illustrated in FIG. 6, according to some embodiments, and may have other functions including emptyPagesOf which may provide a convenient way to initialize a pagesOf structure, and dimRoute, which may provide the route from the root to the leaf for a given page number, in some embodiments.

For instance, insert k v may need to know which page to insert into and to reach that page from the root. The page number may be obtained by hash k 'mod' cardinality Proxy.

For the tree 500 shown in FIG. 5, suppose, for example, that k falls on page 4. In this case, dimRoute_4=Just [2, 0]. That is, the first Branch node passes though branch 2, then through branch 0 to finally reach page number 4. To exclude the dimensions with a zero branching factor, an overlapping instance may be added that uses a TypeError from GHC.TypeLits, in some embodiments. This overlapping instance may ensure that a zero branching factor triggers an error during type checking, in some embodiments. For example,

```
instance {-#OVERLAPPING #-}
    (TypeError "Zero Dimension")
    ⇒ Dimension (0:l) where . . .
```

Error handling may also be considered, in some embodiments. If the key-value store inside page 4 were to throw an error, it may be desirable to record that the error happened on that specific page. A page index may be implemented, in some embodiments, to indicate where an error was thrown by Err (PagesOf1 c)=(Int, Err c). FIG. 7 illustrates recording a page index for an error 700, illustrating insert and the instance declaration for IsMap (PagesOf 1 c), in some embodiments, which may record the page index at which an error occurs.

In some embodiments, partitioning may be implemented to allow use of PagesOf anywhere in combination with other add-ons while retaining paging capabilities. For example, adding a Bloom filter to optimize lookups, as in BloomOf 6 4096 (PagesOf RB) may yield a valid key-value store that has pages inside it. To be able to access these inner pages to transfer them across the network individually, partitioning may be implemented. A type class Partitioned may be created that abstracts the paging-related functionality, enabling access to pages that are stored deep within a tower of combinators, in some embodiments. The Partition class 800, as illustrated in FIG. 8, according to some embodiments, may provide support for accessing the paged structure that might be nested deeply within a tower of add-ons, such as BloomOf 6 4096 (PagesOf . . . ) above. The parts function may return the total number of pages. The partMapWithIdx may allow one to map a function over every page. The onPart and getPart functions may allow one to apply a function to a specific page and retrieve a specific page respectively, in some embodiments. The Maybe in the types of onPart and getPart may be used to flag an out of bounds exception, in some embodiments. Additionally, because onPart may run a computation on an underlying key-value store, it is useful to propagate up any errors it might throw, in some embodiments.

In some embodiments, for the PagesOf 1 c instance, Part (PagesOf 1 c)=c so that the BloomOf add-on may be expressed to respect Partitioned by means of:

```
instance (Partitioned c)
    ⇒ Partitioned (BloomOf c) where
    type Part (BloomOf c) = Part c
    ...
```

In some embodiments, each function may then be defined to call its corresponding function in the map underlying the Bloom filter (unless the Bloom filter indicates the underlying call is unnecessary).

Using partitioned to divide maps into smaller pieces creates an opportunity for some of these pieces to be missing, thus enabling use of a state without needing to receive the entire map first. For example,

```
data PartialOf c k v
    = Present (c k v)
    | Missing Digest
```

When a map is missing, the digest may be recorded, in some embodiments, so that the authenticated functionality can still be provided (e.g., by verifying the digests above the missing piece without having the missing data). This may also ensure that, if the subtree that is missing is subsequently received, it can be verified by computing its digest and comparing it to the recorded one.

The PartialOf add-on may be required to use the Err type family, in some embodiments. Any operation over a Missing map may need to throw an error. In some embodiments, Err (PartialOf c) may be defined as Maybe (Err c), where Nothing corresponds to a missing map, such as:

```
instance (IsMap c) => IsMap (PartialOf c) where
    type Err (PartialOf c) = Maybe (Err c)
    type IsMapCnstr (ParitalOf c) k v - IsMapCnstr c k v
    insert k v (Missing _)
        = throwError Nothing
    insert k v (Present c)
        = Present <$> withExcept Just (insert k v c)
    ...
```

Here, withExcept may have type (e→e')→Except e a→Except e' a. Note that PartialOf does not satisfy Partitioned because a value may not be partitioned if it might not even be present, in some embodiments. Such an implementation may be a safety feature. If the programmer is using some functionality from Partitioned and adds a PartialOf in the wrong place, the compiler could indicate that the PartialOf is in the wrong place. PagesOf (PartialOf c) type may be implemented whose values are key-value stores that are divided into pages, some of which might be absent.

In some embodiments, caching may be implemented. Caching may be implemented to cache recently accessed items, enabling optimizations that exploit locality. For this purpose, on lookups the structure may be updated to record that a key was requested. There may be many ways of doing so. For example, an ST s monad could be introduced and use mutable state. In another example, on lookup, a new version of the map could be returned. A modified lookup function could be implemented in some embodiments, such as:

```
lookup :: (IsMapFor c k v)
    ⇒ k → c k v → Except (Err c) (Maybe (v, c k v))
```

A CacheOf may be parametrized by: the type of key-value store used for the cached part; an eviction policy; and the type of the underlying map, in some embodiments. Eviction policies may be modeled by a type class 900, as shown in FIG. 9. The epEmpty and epSize functions, respectively, may create an empty eviction policy and return how many elements have been registered so far. The epDrop function may remove an element from the policy. When a key is requested, a hit may be recorded with epHit, in some embodiments. Whenever the programmer wants to evict something, epEvict may be invoked and the policy indicates which key to evict. In some embodiments, an unbounded cache combinator, CacheOf, may be provided, as this helps in building more complicated caches, such as BoundedCacheOf. Moreover, having caches evict elements can trigger errors in the underlying map, in case parts of such map are missing, in some embodiments. The programmer might want to have finer control of this mechanism.

A cache may be defined, in some embodiments, as:

```
data CacheOf ep c u k v
    = CacheOf (ep k) (c k v) (u k v)
```

In some embodiments, a write-back cache policy may be implemented. A write-back cache writes modifications to cached data without immediately flushing them to the underlying map. In other embodiments, a write-through cache policy could be implemented.

A write-back design may defer errors and improve performance, in some embodiments. Consider, for example, a map that has some pages missing. Assume a certain key k would fall under a page that is currently missing, but the pair (k, v) is in the cache. If the user issues an adjust f k operation, a write-through cache would trigger a page fault, since it would try to propagate the update in the key k, only to find its page was missing. A write-back cache on the other hand, may update the value in the cache without propagating this update. This may necessitate extra care when retrieving values, in some embodiments. In some embodiments, a user can write her own CacheOf add-on, implementing a write-through approach if desired.

Besides a simple cache with manual eviction, a bounded cache may be provided in some embodiments. The bounded cache may never cache more than b elements, where b is a type level non-zero natural. The bounded cache may just be a newtype wrapper over CacheOf. The constraint on the bound can be imposed with (≤) from GHC.TypeLits for this purpose. For example:

```
newtype BoundedCacheOf (b:: Nat) ep c k v
    = BoundedCacheOf (CacheOf ep c k v)
instance (1≤b, . . .)
    => IsMap (BoundedCacheOf b ep c k v) where
    . . .
```

In addition to the examples discussed above, there are many other combinators that could be implemented in other embodiments. For example, a combinator could be implemented that would allow peers to change the configuration of their maps, in some embodiments. A binary add-on old<+>new that progressively brings data from the old map into the new one, by inducing inserts on new and lookups to search old first and, if found, bring the key-value pair to new could be implemented for instance. By the time old is empty, all the data would have been brought to the new format without incurring a drop in availability.

In various embodiments, HAMM may provide QuickCheck properties that are polymorphic on map type, enabling quick testing of new add-ons against a standard specification that is satisfied by the add-ons provided in the library.

Another example of add-ons that could be implemented are add-ons that manage mutable state, in some embodiments. Caching and paging could benefit from mutable state add-ons. In some embodiments, add-ons that allow for concurrent operations on an authenticated map could also be implemented.

Techniques for authenticating base maps may be implemented using the various features and add-ons discussed above, in various embodiments. Consider, for example, authentication for base map RB. The structure used for authentication is similar to Merkle trees, except that internal nodes contain key-value pairs, whereas Merkle trees typically store data only at the leaves. For this reason, the digest (hash) for a tree node may be a hash of a value that depends not only on the children's hashes (as is typical in Merkle trees), but also on the key-value pair stored at that node, in some embodiments. For RB, it is given by the Digestible instance:

```
instance (Digestible k, Digestible v)
    => Digestible (RB k v) where
    digest Tip = dempty
    digest (Bin _k v l r) = dcat [hash l
        ,dcat[digest k, digest v]
        ,hash r]
```

In the above example, dempty is the empty digest, usually comprised of a hash-length string of zero bits and dcat $[x_1, x_2, \ldots, x_n]$ is defined as digest $(x_1{+}{+}x_2{+}{+} \ldots {+}{+}x_n)$, where ++ denotes concatenation. Note that in the above example, Digest does not make a monoid because dcat [dempty, x]≠x.

Consider that x::RB k v for some k and v. The digest of x, digest x, can be used for integrity checks, in some embodiments. In particular, if x≠x', then digest x'≠digest x. Furthermore, Alice, who knows the full value x, can prove to Bob, who knows only digest x, that a given key-value pair is an element of x. To do so, she provides evidence, analogous to a "Merkle path":

```
data EvRB
    = EvStop Color Digest Digest
    | EvL Color Digest Digest EvRB
    | EvR Color Digest Digest EvRB
```

For the RB key-value store, evidence that some (k, v) belongs in the store comprises a list of steps that the lookup function took to reach k (EvL for left, EvR for right), along with the digest of the opposing tree and of the key-value pair at that node, in some embodiments. If k is found at a node, the evidence ends with an EvStop value containing digests of both sub-trees, in some embodiments. The instance declaration for IsAuthMap RB may, for example, be:

```
instance IsAuthMap RB where
    type Ev RB = EvRB
    fingerprint = digest
```

The vlookup function 1000 may be illustrated in FIG. 10, according to some embodiments. vlookup function 1000 may be a lookup in a Red-Black tree that collects the hashes needed to construct the evidence that will enable verification that the lookup was performed on a tree with the correct top-level digest (fingerprint), in some embodiments.

In some embodiments, a root digest maybe reconstructed from an Ev RB by recomputing hashes as follows:

```
rebuild :: (Dig2 k v)     => k → v → Ev RB → Digest
rebuild k v (EvL c r kv prf) = dcat [digest c, rebuild k v
    prf, kv, r]
```

```
rebuild k v (EvR c l kv prf) = dcat [digest c, l, kv,
    rebuild k v prf]
rebuild k v (EvStop c l r)
    = dcat [digest c, l, dcat [digest k, digest v], r]
```

In some embodiments, a user who knows the root digest of an RB can verify values returned from vlookup using the EvRB it returns:

```
verify :: (Dig2 k v)
    ⇒ Digest → k → v → Ev RB → Bool
verify root k v ev = root ≡ rebuild k v ev
```

In some embodiments, IsAuthMap instances may be used to add authentication functionality for the various add-ons based on an assumption that the underlying map has such an instance. For example, a Bloom filter is one such add-on. The only information that a Bloom filter adds to its underlying map is a bit vector summarizing which keys are in the underlying map (with potential false positives). Therefore, the bit vector may be incorporated into the computation of the digest, in some embodiments.

The evidence that a given key-value pair is a member of a BloomOf may need to carry the digest of the Bloom filter so that a prover can reconstruct the top-level digest, in some embodiments. For example:

```
data EvBloomOf c where
    BEvMember :: (IsAuthMap c)
        ⇒ Digest → Ev c → EvBloomOf c
instance (IsAuthMap c)
    ⇒ IsAuthMap (BloomOf m b c) where
    type Ev (BloomOf m b c) = EvBloomOf c
    fingerprint = digest
    vlookup k (BloomOf bl c)
        |bloomMember k bl|
        = (id *** BEvMember (digest bl)) <$>
            vlookup k c
        | otherwise
        = Nothing
    rebuild k v (BEvMember dbl ev)
        = dcat [dbl, rebuild k v ev]
```

In some embodiments, the verified lookup may provide the digest of the Bloom filter as its evidence and calls the corresponding verified lookup of the underlying map.

In some embodiments, pages are another example of an ad-on where IsAuthMap instances may be used to add authentication functionality. Computing the top-level digest of a PagesOf may be performed, in some embodiments. For example, for each Node in the branching tree, the digests of its children may be combined into a single digest. For leaves, the fingerprint of the underlying map may be used, in some embodiments.

Evidence for pages may be similar to evidence for RB, but may also account for the scenario where nodes have more than two children (as determined by the branching factor list), in some embodiments. For RB, the digest of the subtree opposite to the subtree that is traversed may be kept at each node, in some embodiments. For PagesOf only one such subtree may be traversed and there may be multiple subtrees that are not traversed. These subtrees can be divided into the ones to the left of the subtree traversed and ones to the right of the subtree traversed, in some embodiments. Hence, there may be two lists in the evidence for an internal node:

```
data EvPagesOf (l :: [Nat]) c where
    PGEvPage :: (IsAuthMap c) ⇒ Ev c → EvPagesOf ' [ ] c
    PGEvNode :: (KnownNat n, Dimension l)
        ⇒ [Digest] → [Digest] → EvPagesOf l c
        → EvPagesOf (n ': l) c
```

In some embodiments, the vlookup function may record as evidence at each branch taken the digests of the branches not taken. The rebuild function for PagesOf may take the digest of the concatenation of: the digests for the branches not taken to the left, the digest obtained by rebuilding the path taken, and the digests of branches not taken to the right. For example:

```
rebuild :: (Digestible k, Digestible v, IsAuthMap c
    ⇒ k → v → EvPagesOf l c → Digest
rebuild k v (PGEvPage ev) = rebuild k v ev
rebuild k v (PGEvNode l prf r) =
    dcat (l ++ rebuild k v prf :r)
```

In some embodiments, absence is another example of an add-on where IsAuthMap instances may be used to add authentication functionality. Evidence for PartialOf c may be evidence for c. Because the digest of the underlying map may be kept even though the underlying map might be missing, one example implementation may be:

```
instance (Digestible c) ⇒ Digestible (partialOf c) where
    digest (Present c) = digest c
    digest (missing d) = d
```

Then, in such an example the IsAuthMap instance may be:

```
instance (IsAuthMap c) ⇒ IsAuthMap (PartialOf c) where
    type Ev (PartialOf c) = Ev c
    fingerprint = digest
    vlookup k (Missing d) = throwError Nothing
    vlookup k (Present c) = withExcept Just (vlookup k c)
    rebuild = rebuild
```

In some embodiments, Err (PartialOf c)=Maybe (Err c), where Nothing signals that an operation was attempted on a key-value store that was missing. The rebuild function may call the rebuild function of the IsAuthMap c instance.

In some embodiments, caching is another example of an add-on where IsAuthMap instances may be used to add authentication functionality. The digest of a CacheOf may be the digest of the concatenation of the digests of the cache and the underlying map, in some embodiments. For example:

```
instance (M.IsAuthMap cached, M.IsAuthMap c, Dig2 k v)
    ⇒ Digestible (CacheOf ev cached c k v) where
    digest (CacheOf ep c u) =
        digestConcat [fingerprint ep, fingerprint c,
        fingerprint u]
```

In some embodiments, the vlookup and rebuild functions for CacheOf may follow a similar approach to those used for RB and PagesOf:vlookup records as evidence the digest of the path not taken (i.e., the underlying map if the key is found in the cache, and the cache if not), and rebuild reconstructs the digests by following the evidence and using the not-taken digests to compute hashes up to the top-level add-on.

In the examples given above, the code or pseudocode used may be illustrative of code to implement the techniques described above. However, in some embodiments, some variations may be implemented. For example, in one embodiment, a Writer monad transformer may be implemented to collect evidence generated during a verified lookup on a Red-Black tree base map as [EvRB], so EvL and EvR contain only the relevant digests, not an explicit EvRB for the rest of the list. In some embodiments, the rebuild functions may receive a Proxy c (not shown above), which may be used to enable the use of the appropriate rebuild function for each base map and add-on.

Users of the HAMM library may, in some embodiments, define an authenticated map by directly using a base map such as RB. However, other use cases may utilize a map different than the base map to address other uses cases.

In some embodiments, an example map may be implemented as discussed below that demonstrates the use of the add-ons described above. The first step may be to split the map into multiple pages, each of which may be Missing, thus enabling a participant to receive and verify a map without acquiring all of its contents, for instance:

PagesOf l (PartialOf RB)

In this example, l may be the branching structure for PagesOf (as discussed above). With this configuration, a lookup for a key that is not in the map may have to examine the page in which the key would reside, in some embodiments. If the page is Missing, then it would have to request, receive and verify that page, thereby negating the benefit of not fetching the page in the first place. A Bloom filter can filter out many requests for keys that are not in the map. This may reduce overhead even if the key's page is Present, and avoids the costs of requesting, receiving and verifying the page if it is Missing. The resulting configuration may, for example, be:

BloomOf m k (PagesOf l (PartialOf RB))

Here, m may be the number of bits in the Bloom filter and k may be the number of hash functions it uses.

In some embodiments, a participant requesting a map may need at least some keys to work. By augmenting the example configuration with a cache and including the cached keys in the summary received by a new participant, the likelihood that some or all keys needed by the new participant are available may be increased without requesting additional data, in some embodiments. For example:

```
BoundedCacheOf b LRU RB (BLoomOf m k
    (PagesOf l (PartialOf RB)))
```

Here, BoundedCacheOf provides a cache that contains up to b keys in an RB, managed by the LRU eviction policy, which evicts the least-recently-used key when the cache size exceeds b. BoundedCacheOf and LRU are provided as examples with HAMM; Other add-ons and/or eviction policies may be implemented in other embodiments.

The resulting configuration of the above example may be identified as PWB-1BC (Partial/Paged with Bloom and One Bounded Cache).

Although there are advantages to PWB-1BC, the application may be limited to one cache: keys not included in this cache may be scattered throughout the pages of the underlying map, in some instances. This introduces a tradeoff: too small a cache will fail to exploit locality, while too large a cache will unnecessarily increase initial summary size. This tradeoff can be addressed in some embodiments by nesting CacheOf add-ons, making evicted keys "cascade" down the layers. For example, multiple instances of BoundedCacheOf may be used, in some embodiments, to construct a series of caches that keep a specified number of elements in each cache, automatically evicting elements when a cache exceeds its bound. For example:

```
type FiveLayers
    = boundedCacheOf 10 LRU (PartialOf RB)
    = boundedCacheOf 50 LRU (PartialOf RB)
    = boundedCacheOf 100 LRU (PartialOf RB)
    = boundedCacheOf 200 LRU (PartialOf RB)
        (PartialOf RB))))
```

In view of the above, an instance could be implemented for Partitioned FiveLayers; the parts may be of type PartialOf RB. The first page may contain the 10 most recently used elements; the second page may contain the next 50 most recently used elements, and so on, in some embodiments.

In some embodiments, a type family of "cascading caches" can be constructed, such as:

```
type family Cascache (bounds :: [Nat])
    :: * → * → * where
    Cascache '[ ] = PartialOf RB
    Cascache (b ': l) = BoundedCacheOf b LRU
        (PartialOf RB)
        (Cascache l)
```

In view of the above type family of cascading caches, FiveLayers could be rewritten as:

type FiveLayers=Cascache [10, 50, 100, 200]

The above examples may enable more flexible caching that can help address the tradeoff discussed above. However, such an embodiment may lose the benefits of the BloomOf and PagesOf add-ons used by PWB-1BC. In some embodiments, however, cascading caches could be implemented as an add-on. For example:

```
type family Cascache (bounds :: [Nat])
        (base :: * → * → *)
    :: * → * → * where
    Cascache '[ ] = base
    Cascache (b ': l) base
        = BoundedCacheOf b LRUe
            (PartialOf RB)
            (Cascache l base)
```

Now, the base variable represents the map to use for the base case. In view of the above example, the add-on could be further elaborated as:

```
type MyCascache bounds blSize blHashN pgDim
    = Cascache bounds (BloomOf blSize blHashN
        (PagesOf pgDim
        (PartialOf RB)))
```

This construction puts a Cascache on top of PWB-1BC.

In various embodiments, further configurations, add-ons and workloads can be explored to extend the techniques discussed above. For example, access to and assessment of hit rates for caches and Bloom filters for a given workload could be implemented, in some embodiments.

In some embodiments, combinators could be added to provide mutable state to enhance performance. Bloom filters, for example, may be increased substantially by using mutable state, in some embodiments. This can be accomplished by lifting the library to work under a PrimMonad (e.g., either IO or STs), in some embodiments.

In some embodiments, proofs of absence may be implemented. For example, evidence of a failed lookup may be created, maintained, and/or provided (similarly to how our membership proofs provide evidence of a successful one), in some embodiments. Such an implementation would prove absence of the target key only under the assumption that the search tree is correctly structured and ordered.

In some embodiments, changing map configurations may be implemented. In some contexts, it may be desirable to change map configurations "on the fly". All data could be evacuated from a map, for example, into a new map with a different configuration, in one embodiment. Incremental evacuation from one map to another map over time may be implemented in another embodiment. Some changes in configuration may, in some embodiments, make use of type casting. For example, resizing a cache to accommodate more keys may cast the map type to a new type that has a new type level Nat representing the size of the cache.

In various embodiments, HAMM may support flexible declarations of authenticated map data structures with a wide range of internal implementations favoring different workloads and conditions. Participants can verify and begin work with a partial copy of a map. In this way, participants in blockchain networks can quickly obtain a "world state" from an untrusted party, verify it against a trusted digest, and begin work without obtaining the entire data structure first. In various embodiments, techniques based on monad transformers may enable modular construction of a wide variety of configurations combining features such as caches, Bloom filters, paging and allowing parts of the data structure to be "missing."

Figure 11:
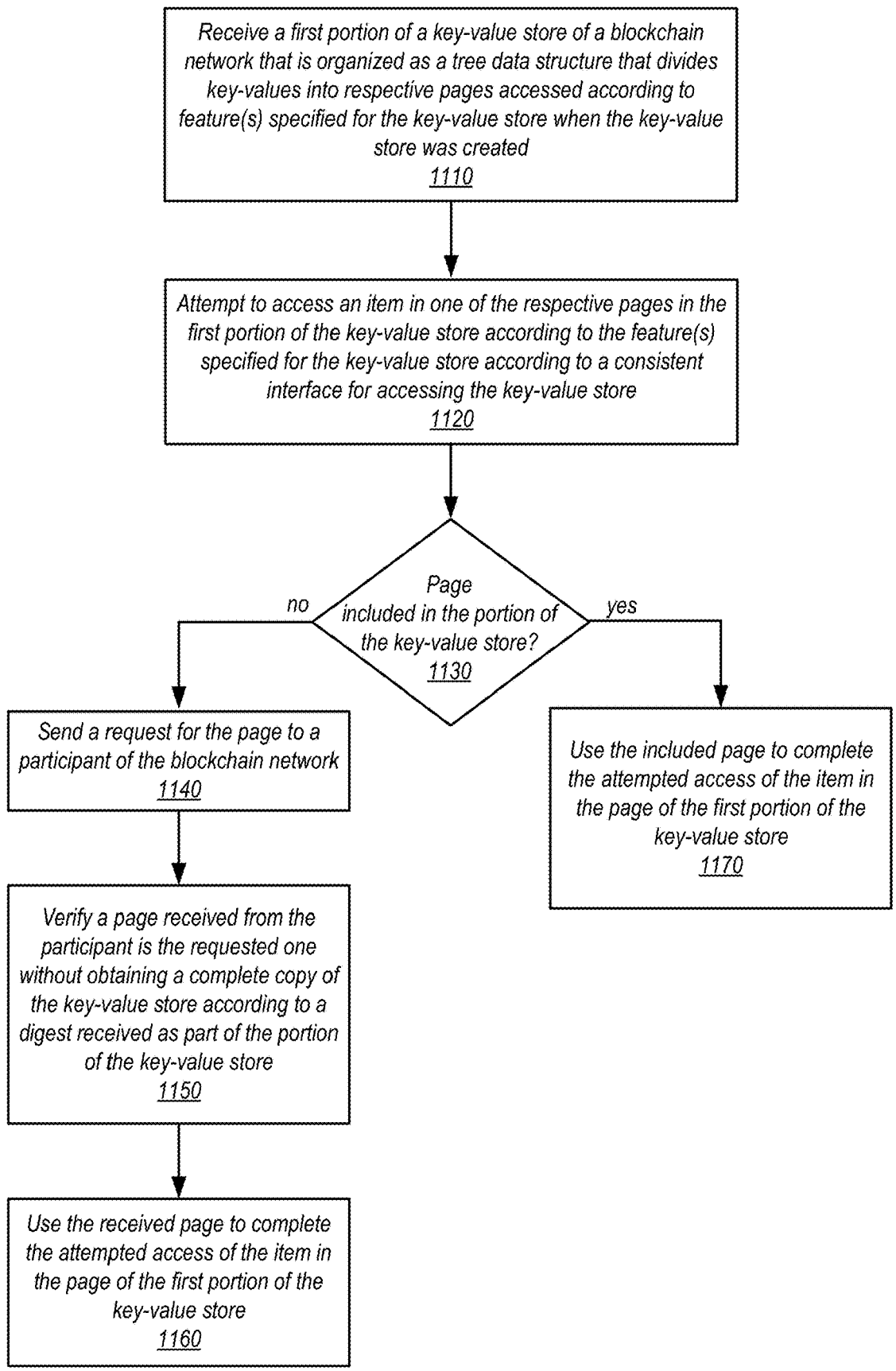
FIG. 11 illustrates a high-level flowchart of various methods and techniques that implement authenticated key-value stores supporting partial state, according to some embodiments.

The examples of a modular authenticated map library discussed above that implement support for key-value stores supporting partial state as discussed in FIGS. 3-10 above have been given in regard to the HAMM library. However, various other types of programming languages and libraries may be created to provide similar map structures, authentication features, interfaces, and modular add-ons and thus may support key-value stores with partial state, in other embodiments. FIG. 11 illustrates a high-level flowchart of various methods and techniques that implement authenticated key-value stores supporting partial state, according to some embodiments. These techniques, as well as the techniques discussed with regard to FIG. 12, may be implemented using components or systems as described above with regard to FIGS. 1-10, as well as other types of systems, and thus the following discussion is not intended to be limiting as to the other types of systems that may implement the described techniques.

As indicated at 1110, a first portion of a key-value store of a block-chain network that is organized as a tree data structure that divides key-values into respective pages accessed according to feature(s) specified for the key-value store when the key-value store was created may be received, in some embodiments. As discussed above, HAMM or other techniques implementing the features of HAMM in a different modular authenticated map library may be used to create a key-value store that organizes the key-value store as a map (e.g., as discussed above with regard to FIGS. 5 and 6). In some embodiments, the portion of the key-value store may be received in response to a request for one or more pages of the key-value store. Paging techniques may be used to retrieve a page of a key-value store, for instance. The key-value store may be hosted by another participant in the block-chain system, in some embodiments. Features of the key-value store may be various ones of the features discussed above, such as one or more Bloom filters, one or more caches, or other features for modifying, optimizing, and/or supplementing access to the key-value data store, in some embodiments (which may be used singly or in various combinations).

As indicated at 1120, access to an item in one of the pages in the first portion of the key-value store according to the feature(s) specified for the key-value store may be attempted according to a consistent interface for accessing the key-value store, in some embodiments. For example, as discussed above with regard to FIG. 1, an authenticated modular map library may offer applications the capability to leverage a common interface to access a key-value store item (or portion thereof), such as the "toList", "lookup", "empty", "delete", "insert", "adjust", "fingerprint", "vlookup", and "rebuild" features of FIGS. 3 and 4. Because the consistent interface may allow for these same APIs to interact with a key-value store created with different ones of the specified features noted above (e.g., Bloom filters, caches, partitions, etc.), a client application can invoke the interface, which may perform the attempt to access through or otherwise utilizing the various features, without a change in API to the client application, in some embodiments. Thus, if a Bloom filter and cache were used to quickly identify items or pages of the key-value store not present and items that have recently been retrieved, then the consistent interface would utilize the Bloom filter and cache to perform the requested access operations (e.g., a read or write operation to an item in a page of the key-value store).

As indicated at 1130, a determination may be made as to whether a page is included in the portion of the key-value store, in some embodiments. An attempt to access the page may, for instance, trigger an error to indicate that a page is missing. In some embodiments, a page could be first checked to see if the page has a "missing" error before attempting to access it.

If the page is present, as indicated at 1170, then the included page that is present may be used to complete the attempted access of the key-value in the page of the first portion of the key-value store. For example, the operation may be one of multiple operations made to authenticate a new participant in the blockchain system, which can then propose new transactions or other changes to the key-value store. In some embodiments, the operations may be related to obtaining further key-value store data (e.g., in scenarios where the verification is performed as part of replacing a failing node in a decentralized system implementing the blockchain). Various other operations, as discussed in the examples above may be performed, in some embodiments.

In some embodiments, the page (as well as the entire first portion of the key-value store) may be verified after determining the page is present. For example, various digest values, as discussed above, may be used such as the evaluation of values according to the fingerprint technique. In another embodiment, the vlookup technique discussed above may be used, as well as various other verification techniques previously described or based on digest evaluation (e.g., comparing hash values computed for the first portion, but without requiring the use of all other key-store values or transactions). In some embodiments (not illustrated), verification may be performed once a portion of a key-value store is received before access to the key-value store portion is attempted. The verification of the page (or entire portion of the key-value store) may be performed without obtaining a complete copy of the key-value store according to a digest received as part of the key-value store, in some embodiments.

If the page is not present, as indicated by the negative exit from 1130, then a request for the page may be sent to a participant of the blockchain network, as indicated at 1140, in some embodiments. The request may be sent to a same participant that sent the portion of the key-value store and/or to a different participant, in some embodiments. The request may include an identifier for the page (or pages), in some embodiments. As indicated at 1150, a page received from the participant may be verified to determine whether the received page is the requested page without obtaining a complete copy of the key-value store according to a digest received as part of the portion of the key-value store, in some embodiments. Similar to the discussion above, various digest values may be used such as the evaluation of values according to the fingerprint technique. In another embodiment, the vlookup technique may be used, as well as various other verification techniques previously described or based on digest evaluation (e.g., comparing hash values computed for the first portion, but without requiring the use of all other key-store values or transactions).

As indicated at 1160, the received page may be used to complete the attempted access of the item in the page of the first portion of the key-value store, in some embodiments. Like the discussion above at 1170, the operation may be one of multiple operations made to authenticate a new participant in the blockchain system, which can then propose new transactions or other changes to the key-value store. In some embodiments, the operations may be related to obtaining further key-value store data (e.g., in scenarios where the verification is performed as part of replacing a failing node in a decentralized system implementing the blockchain). Various other operations, as discussed in the examples above may be performed, in some embodiments.

Figure 12:
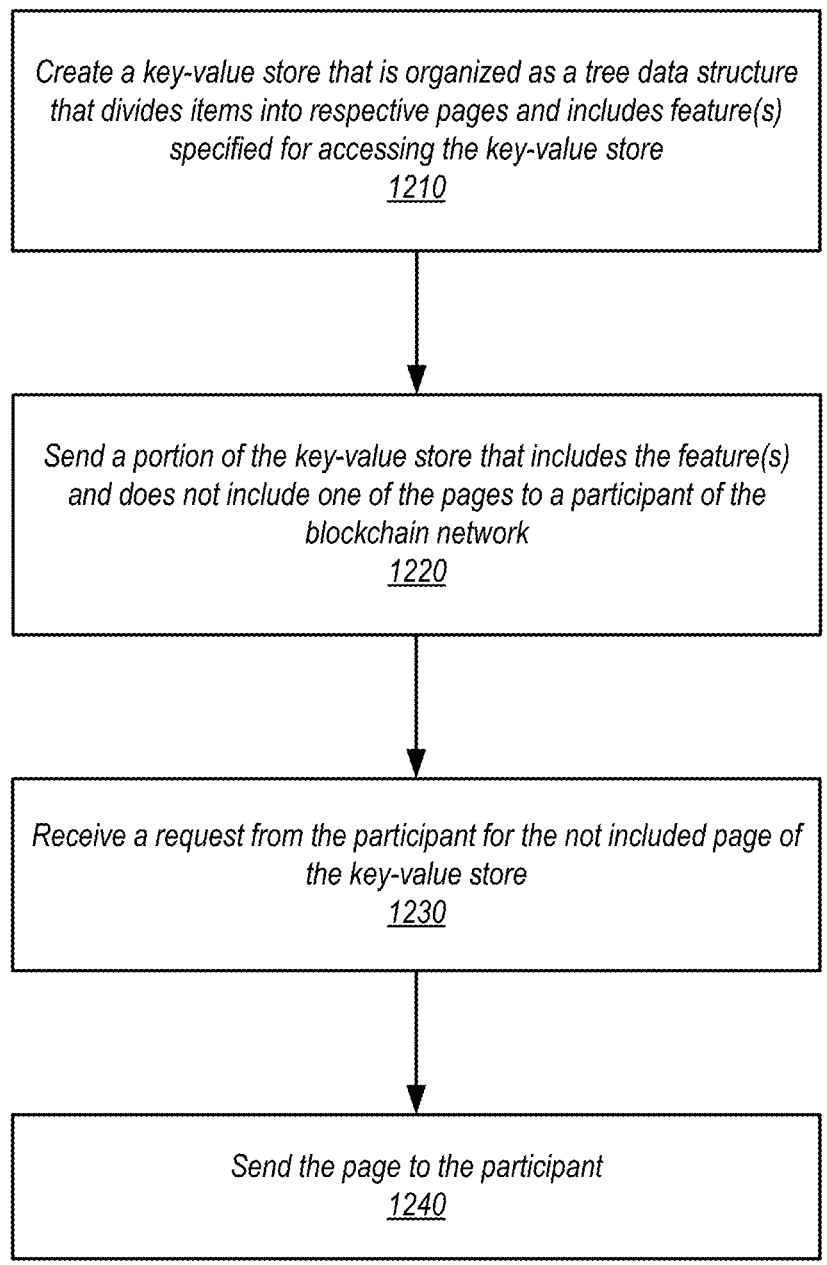
FIG. 12 illustrates a high-level flowchart of various methods and techniques that implement generating authenticated key-value stores supporting partial state, according to some embodiments.

FIG. 12 illustrates a high-level flowchart of various methods and techniques that implement generating authenticated key-value stores supporting partial state, according to some embodiments. As indicated at 1210, a key-value store may be created that is organized as a tree data structure that divides items into respective pages and includes features specified for accessing the key-value store, in some embodiments. For instance, the divisions of pages and partitions (e.g., using the "Dimensions" class) discussed above with regard to FIGS. 5 and 6, may allow for the key-value store to be structured into one or more partitions that include one or more pages of leaf values that represent the items in the key-value store, in some embodiments.

Creation of the key-value store may be performed using an authenticated modular map library, similar to those discussed above with regard to FIGS. 1-10, in some embodiments. The organization structure as well as various features for accessing the key-value store may be specified according to the consistent interface offered by the authenticated modular map library. For example, the number of hash functions or other configuration information for a Bloom filter may be specified for creating the key-value store, including those partitions or pages to which the Bloom filter corresponds e.g., to indicate whether a value is present in the partitions or pages). Similarly, the configuration of a cache, such as the eviction policy, size, or other cache configuration information may be specified via the consistent interface. The authenticated modular map library may then be used to create the key-value store with the features as specified in a request to create the key-value store, in some embodiments.

As indicated at 1220, a portion of the key-value store that includes the feature(s) and does not include one of the page(s) may be sent to a participant of the blockchain network, in some embodiments. For example, the portion of the key-value store may include information to participate, operate upon, update, or otherwise utilize a transaction included in the blockchain network or proposed in the blockchain network, in some embodiments. In another example, a recent transaction history, or selective transaction history may be provided as the portion of the key-value store, while remaining portions (such as the not included page) are held back unless specifically requested (e.g., to save costs to transfer the remaining portions).

As not all page(s) are sent, a request may be received later from the participant for the not included page of the key-value store, in some embodiments. The request may include an identifier for the page, in some embodiments. The page may then be retrieved, read, or otherwise obtained (e.g., from storage or memory) and sent to the participant, as indicated at 1240, in some embodiments.

Figure 13:
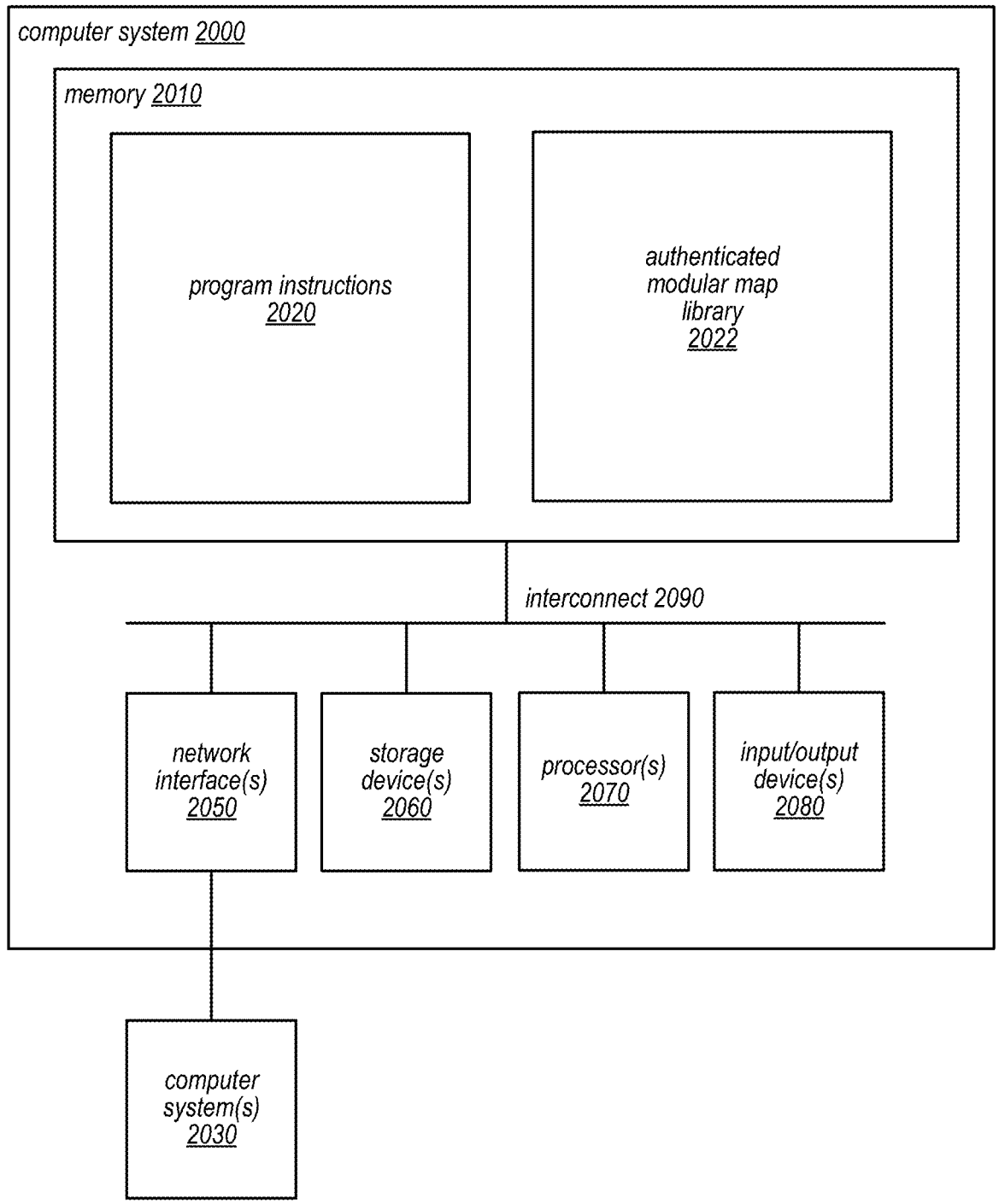
FIG. 13 illustrates an example computing system, according to some embodiments.

FIG. 13 illustrates a computing system configured to implement the methods and techniques described herein, according to various embodiments. The computer system 2000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing authenticated key-value stores supporting partial state on a computing system, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 2000 may include one or more processors 2070; each may include multiple cores, any of which may be single or multi-threaded. Each of the processors 2070 may include a hierarchy of caches, in various embodiments. The computer system 2000 may also include one or more persistent storage devices 2060 (e.g. optical storage, magnetic storage, hard drive, tape drive, solid state memory, etc.) and one or more system memories 2010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 13 (e.g., video cards, audio cards, additional network interfaces, peripheral devices, a network interface such as an ATM interface, an Ethernet interface, a Frame Relay interface, etc.)

The one or more processors 2070, the storage device(s) 2050, and the system memory 2010 may be coupled to the system interconnect 2040. One or more of the system memories 2010 may contain program instructions 2020. Program instructions 2020 may be executable to implement authenticated key-value stores supporting partial state, including storing an authenticated modular map library 2022, such as the HAMM library discussed above, in some embodiments as described herein. Program instructions 2020 may be encoded in platform native binary, any interpreted language such as Java™ byte-code, or in any other language such as C/C++, Java™, etc. or in any combination thereof. System memories 2010 may also contain LRU queue(s) 2026 upon which concurrent remove and add-to-front operations may be performed, in some embodiments.

In one embodiment, Interconnect 2090 may be configured to coordinate I/O traffic between processors 2070, storage devices 2070, and any peripheral devices in the device, including network interfaces 2050 or other peripheral interfaces, such as input/output devices 2080. In some embodiments, Interconnect 2090 may perform any necessary protocol, timing or other data transformations to convert data signals from one component (e.g., system memory 2010) into a format suitable for use by another component (e.g., processor 2070). In some embodiments, Interconnect 2090 may include support for devices attached through various types of peripheral buses, such as a variant of the Peripheral Component Interconnect (PCI) bus standard or the Universal Serial Bus (USB) standard, for example. In some embodiments, the function of Interconnect 2090 may be split into two or more separate components, such as a north bridge and a south bridge, for example. In addition, in some embodiments some or all of the functionality of Interconnect 2090, such as an interface to system memory 2010, may be incorporated directly into processor 2070.

Network interface 2050 may be configured to allow data to be exchanged between computer system 2000 and other devices attached to a network, such as other computer systems, or between nodes of computer system 2000. In various embodiments, network interface 2050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2080 may, in some embodiments, include one or more display terminals, keyboards, keypads, touchpads, scanning devices, voice or optical recognition devices, or any other devices suitable for entering or retrieving data by one or more computer system 2000. Multiple input/output devices 2080 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2050.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   at least one processor; and
   a memory, storing an authenticated modular map library and program instructions, wherein the program instructions when executed by the at least one processor cause the at least one processor to:
      receive a portion of a key-value store of a blockchain network, wherein the key-value store is organized as a tree data structure that divides one or more key-values into respective pages accessed according to one or more features specified for the key-value store when the key-value store was created according to the authenticated modular map library;
      attempt to access an item in one of the respective pages in the portion of the key-value store according to the one or more features specified for the key-value store;
      determine from the attempt that the one page is not included in the received portion of the key-value data store;
      send a request for the one page of the key-value store to a participant in the blockchain network; and
      verify that a page received from the participant in the blockchain network is the requested one page of the portion of the key-value store without obtaining a complete copy of the key-value store according to a digest received as part of the portion of the key-value store; and
      after verification of the received page, use the received page to complete the attempted access of the item in the one page in the portion of the key-value store.

2. The system of claim 1, wherein the one or more features comprise a cache of items read from the key-value store, and wherein to attempt to access the item in one of the respective pages in the portion of the key-value store according to the one or more features specified for the key-value store, the program instructions cause the at least one processor to:
   access the cache to obtain the item; and
   responsive to determining that the item is not present in the cache, attempt an operation to obtain the item from the page.

3. The system of claim 1, wherein the one or more features comprise a Bloom filter that indicates if an item is not present in the key-value store, and wherein to attempt to access the item in one of the respective pages in the portion of the key-value store according to the one or more features specified for the key-value store, the program instructions cause the at least one processor to evaluate the Bloom filter to determine whether the item is present in the key-value store.

4. The system of claim 1, wherein to determine from the attempt that the one page is not included in the received portion of the key-value data store, the program instructions cause the at least one processor to detect a page missing error.

5. The system of claim 1, wherein the memory comprises additional program instructions that cause the at least one processor to update an error index for the page to indicate that the page is missing.

6. A method, comprising:
   performing, by one or more computing devices:
      creating a key-value store for a blockchain network, wherein the key-value store is organized as a tree data structure that divides one or more items into respective pages and comprises one or more features specified for accessing the key-value store;

sending a portion of the key-value store to a participant of the blockchain network including the one or more features specified for accessing the key-value store, wherein at least one of the respective pages is not included in the portion of the key-value store;

receiving a request from the participant of the blockchain network for the at least one respective page not included in the portion of the key-value store; and sending the at least one respective page to the participant.

7. The system of claim 1, wherein the attempt to access the item in one of the respective pages in the portion of the key-value store according to the one or more features specified for the key-value store is performed according to a consistent interface implemented by the authenticated modular map library.

8. The method of claim 6, wherein the tree data structure is organized according to a specified branching factor for the key-value store.

9. The method of claim 6, wherein the one or more features comprise a Bloom filter and a cache.

10. A method, comprising:
performing, by one or more computing devices:
receiving a portion of a key-value store of a blockchain network, wherein the key-value store is organized as a tree data structure that divides one or more key-values into respective pages accessed according to one or more features specified for the key-value store when the key-value store was created; and accessing an item to be found in one of the respective pages of the portion of the key-value store according to a consistent interface for accessing the key-value store, wherein the accessing comprises:
determining that the one of the respective pages in the portion of the key-value store is included in the portion of the key-value store according to the one or more features specified for the key-value store.

11. The method of claim 10, wherein the one or more features comprise a cache of items read from the key-value store and wherein determining that the one of the respective pages in the portion of the key-value store is included in the portion of the key-value store according to the one or more features specified for the key-value store comprises accessing the cache to obtain the item from the cache.

12. The method of claim 10, wherein the one or more features comprise a Bloom filter that indicates if an item is not present in the key-value store and wherein determining that the one of the respective pages in the portion of the key-value store is included in the portion of the key-value store according to the one or more features specified for the key-value store comprises evaluating the Bloom filter to determine whether the item is not present in the key-value store.

13. The method of claim 10, wherein the key-value store is created according to an authenticated modular map library that supports the specified one or more features, and wherein the consistent interface is implemented by the authenticated modular map library.

14. The method of claim 10, further comprising verifying the portion of the key-value store according to a digest received as part of the portion of the key-value store without obtaining a complete copy of the key-value store.

15. The method of claim 10, wherein the portion of the key-value store is a partition of the key-value store comprising one or more of the respective pages and wherein the method further comprises:
sending a request to a participant of the blockchain network for the partition of the key-value store, wherein the partition of the key-value store is received from the participant as a response to the request.

16. The method of claim 10, wherein the one or more features comprise an error index that indicates if a page missing error was detected for the respective pages of the key-value store and wherein determining that the one of the respective pages in the portion of the key-value store is included in the portion of the key-value store according to the one or more features specified for the key-value store comprises evaluating the error index to check for a page missing error for the one respective page.

17. The method of claim 10, further comprising:
receiving another portion of the key-value store; and
accessing another item in another one of the respective pages to be found in the other portion of the key-value store according to the consistent interface for accessing the key-value store, wherein the accessing comprises:
determining that the other one of the respective pages in the other portion of the key-value store is included in the other portion of the key-value store according to another feature specified for the key-value store different than the one or more features.

18. The method of claim 6, wherein the specified one or more features comprises a cache to store previously read items from the key-value store, and wherein the cache is configured according to:
a specified size;
a specified eviction policy; or
a specified size and a specified eviction policy.

19. The method of claim 6, wherein the specified one or more features comprises a Bloom filter to indicate items not present in the key-value store, and wherein the Bloom filter is configured according to:
a specified size;
a specified one or more hash functions; or
a specified size and a specified one or more hash functions.

20. The method of claim 6, further comprising receiving a request to create the key-value store according to a consistent interface implemented by an authenticated modular map library and wherein the one or more features are specified according to the interface.

21. The method of claim 6, wherein the portion of the key-value store sent to the participant of the blockchain network is a partition of the key-value store specified for the key-value store when the key-value store was created.

* * * * *

UNITED STATES PATENT AND TRADEMARK OFFICE
CERTIFICATE OF CORRECTION

| | |
|---|---|
| PATENT NO. | : 11,269,839 B2 |
| APPLICATION NO. | : 16/355563 |
| DATED | : March 8, 2022 |
| INVENTOR(S) | : Miraldo et al. |

It is certified that error appears in the above-identified patent and that said Letters Patent is hereby corrected as shown below:

In the Specification

In Column 2, Line 51, delete "time)." and insert -- time. --, therefor.

In Column 6, Line 23, delete "ckv" and insert -- c k v --, therefor.

In Column 6, Line 44, delete "types." and insert -- types). --, therefor.

In Column 6, Line 36, delete "ckv" and insert -- c k v --, therefor.

In Column 10, Line 45, delete "PagesOf" and insert -- PagesOf, --, therefor.

In Column 10, Line 55, delete "1" and insert -- l --, therefor.

In Column 10, Line 61, delete "emptyPagesOf" and insert -- emptyPagesOf, --, therefor.

In Column 11, Line 10, delete "example," and insert -- example: --, therefor.

In Column 12, Line 2, delete "example," and insert -- example: --, therefor.

In Column 13, Line 43, delete "=>" and insert -- ⇒ --, therefor.

In Column 15, Line 62, delete "PagesOf" and insert -- PagesOf, --, therefor.

In Column 16, Line 16, delete "IsAuthMap c" and insert -- IsAuthMap c) --, therefor.

Signed and Sealed this
Ninth Day of August, 2022

*Katherine Kelly Vidal*
Katherine Kelly Vidal
*Director of the United States Patent and Trademark Office*